United States Patent
Fortenberry et al.

(10) Patent No.: US 6,874,005 B2
(45) Date of Patent: Mar. 29, 2005

(54) SUBEXPRESSION SELECTION OF EXPRESSION REPRESENTED IN CONTIGUOUS TOKENIZED POLISH REPRESENTATION

(75) Inventors: Todd D. Fortenberry, McKinney, TX (US); Laura K. Harvey, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 655 days.

(21) Appl. No.: 10/035,099

(22) Filed: Dec. 28, 2001

(65) Prior Publication Data

US 2003/0122776 A1 Jul. 3, 2003

(51) Int. Cl.⁷ ............................. G06F 15/02; G06F 3/00
(52) U.S. Cl. ..................... 708/130; 708/131; 708/160
(58) Field of Search ............................ 708/100, 130, 708/131, 136, 142, 160

(56) References Cited

U.S. PATENT DOCUMENTS

| | | | | |
|---|---|---|---|---|
| 4,852,057 A | * | 7/1989 | Patton | 708/136 |
| 5,189,633 A | * | 2/1993 | Bonadio | 708/142 |
| 5,544,262 A | * | 8/1996 | Pagallo | 382/189 |
| 6,058,385 A | * | 5/2000 | Koza et al. | 706/13 |
| 6,795,838 B1 | * | 9/2004 | Kataoka | 708/160 |

OTHER PUBLICATIONS

"Symbolic Math Guide, A Concept APP for the TI–89 and TI–92 Plus", at website: http://education.ti.com/product/tech/92p/apps/smg.html, 2001.
"TI–89 & TI–92 Plus Flash Software Guidebook, Symbolic Math Guide Application—Documentation, Symbolic Math Guide Application—Guided Tour, and Calculus with Symbolic Math Guide Application Instructor's Guide", at website: http://education.ti.com/product/tech/92p/apps/92p17/92p92p17gbus.html, 2001
"TI–89/TI–92 Plus Developer Guide", Beta Version .02, Chapter 15, at website: http://education.ti.com/pdf/product-info/sdk/sdk8992pguide.pdf, 2001.

* cited by examiner

*Primary Examiner*—Chuong Dinh Ngo
(74) *Attorney, Agent, or Firm*—W. James Brady III; Frederick J. Telecky Jr.

(57) ABSTRACT

An algorithm and handheld device adapted to select a subexpression of a mathematical expression. An expression string of the handheld device is selected, and the expression string is converted to a contiguous tokenized Polish representation (CTPR) of the expression, and the CTPR of the expression is loaded into an n-ary tree. The user may navigate the visual representation of the expression to select a subexpression. The handheld device is adapted to select the subexpression from the n-ary tree.

23 Claims, 7 Drawing Sheets

Figure 14 a+c+b → acb++

SUBEXPRESSION SELECTION OF EXPRESSION REPRESENTED IN CONTIGUOUS TOKENIZED POLISH REPRESENTATION

CROSS-REFERENCE TO RELATED APPLICATIONS

Embodiments of the present invention are related to commonly-assigned U.S. patent application Ser. No. 09/938,772, filed on Aug. 24, 2001 by Brothers, et al, entitled "Selection Of Mathematical Objects From The History Screen On A Handheld Device," which is incorporated herein by reference.

REFERENCE TO COMPUTER PROGRAM LISTING APPENDIX

The material on two identical compact disks created on Dec. 28, 2001, Copy 1 and Copy 2, containing the 46 kB file "Appendix A and B" is incorporated herein by reference.

TECHNICAL FIELD

This invention relates to electronic calculators, and more particularly to a calculator that allows the user to select mathematical subexpressions from mathematical expressions for various uses.

BACKGROUND

Electronic calculators have become a common tool for teaching students mathematics. In particular, graphing calculators are being utilized in the classroom. internally in calculators because of the space efficiency and relocatibility of this expression form.

SUMMARY OF THE INVENTION

Embodiments of the present invention provide technical advantages as an algorithm and handheld device adapted to select subexpressions of mathematical expressions that have been converted to a CTPR. The selected subexpression may then be replaced within the mathematical expression, or copied to a different mathematical expression.

In one embodiment, disclosed is an algorithm for a handheld device for selecting a subexpression of a mathematical expression. The algorithm comprises selecting an expression string of the handheld device, converting the string to a CTPR of the expression, wherein at least one operator of the CTPR is binary. The algorithm includes loading the CTPR of the expression into an n-ary tree. The user may navigate within the visible representation of the expression to select a subexpression, wherein the handheld device is adapted to select the subexpression from the n-ary tree.

Also disclosed is a handheld device, comprising a screen capable of displaying mathematical expressions and including a cursor, a key panel having keys at least capable of selecting positions of the cursor and moving the cursor horizontally or vertically on the screen, and a memory for storing at least an algorithm. The handheld device includes a processor for executing the algorithm, wherein the algorithm allows a user to select a subexpression of an expression. The algorithm includes selecting an expression string, converting the string to a CTPR of the expression, wherein at least one operator of the CTPR is binary, and loading the CTPR of the expression into an n-ary tree, wherein the user may navigate within the visible representation of the expression to select a subexpression, and wherein the handheld device is adapted to select the subexpression from the n-ary tree.

Advantages of embodiments of the present invention include providing the ability to conveniently select subexpressions from mathematical expressions that have been converted internally to CTPR. Embodiments of the invention eliminate the need to restructure the CTPR which may be needed in order to select a given subexpression, saving code space and process time. Because preferably, the n-ary tree mimics the visual representation of the expression, the n-ary tree does not have to be restructured while selecting any subexpression. Embodiments of the invention are particularly advantageous when the CTPR contains at least one operator +, −, *, "and", "or" that is binary.

BRIEF DESCRIPTION OF THE DRAWINGS

The above features of embodiments of the present invention will be more clearly understood from consideration of the following descriptions in connection with accompanying drawings in which.

Corresponding numerals and symbols in the different figures refer to corresponding parts unless otherwise indicated. The figures are drawn to clearly illustrate the relevant aspects of the preferred embodiments and are not necessarily drawn to scale.

DETAILED DESCRIPTION OF PREFERRED EMBODIMENTS

Problems with attempting to select subexpressions of expressions in CTPR will be discussed, followed by a description of some preferred embodiments and some advantages of embodiments of the invention.

Modern calculators have increased functionality compared with calculators of the past. Some calculators are educational calculators designed for use by students, and some of these educational calculators contain functionalities designed to facilitate students' learning and understanding of mathematical expressions.

One such desired functionality for an educational calculator is the ability to select a valid subexpression within a given mathematical expression, transform the selected subexpression to a new subexpression, and replace the selected subexpression in the original expression with the new subexpression. Alternatively, another desired functionality is the ability to select a valid subexpression within a given mathematical expression, copy the selected subexpression, and insert the selected subexpression into a different mathematical expression.

Some calculators may utilize a step-by-step Computer Algebra System (CAS), that allows users to transform mathematical expressions much in the same way they would with a pencil and paper. There are several difficulties with subexpression selection in a CAS. In a CAS, the selection and replacement of subexpressions in a mathematical expression must be carried out simultaneously in two distinct realms, the internal representation of the mathematical expression that is invisible to the user, and the visible representation of the mathematical expression that is viewed by the user. Embodiments of the present invention are directed primarily towards the processes needed to handle the selection and replacement in the internal representation of the mathematical expressions. Once these processes are determined, the visual selection and replacement viewed by the user of a CAS may be implemented.

Figure 1:
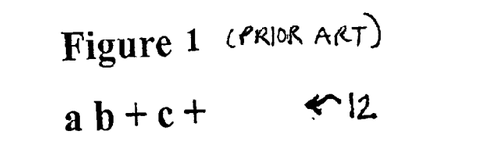
FIG. 1 illustrates a prior art CTPR for the expression with the string representation "a+b+c"

The difficulties faced are dependent upon the environment from which the problem arises. Embodiments of the present invention were developed for a CAS that employs a CTPR for internally representing mathematical expressions. In this CTPR, some operators are binary, e.g., +, −, *, "and", "or", which means that some subexpressions cannot be selected. In systems that use CTPR, an expression occupies one contiguous block of memory allocated as an array of unsigned characters. CTPR places the operands deepest in the representation and the operator higher or on top of the operands. For example, the simple sum "a+b+c" is stored in memory as shown in FIG. 1, where the lowest address is on the left and the highest address on the right. CTPR representation has two primary advantages: space efficiency and relocatability. No internal pointers are necessary to manipulate or maintain the structure.

Figure 2:
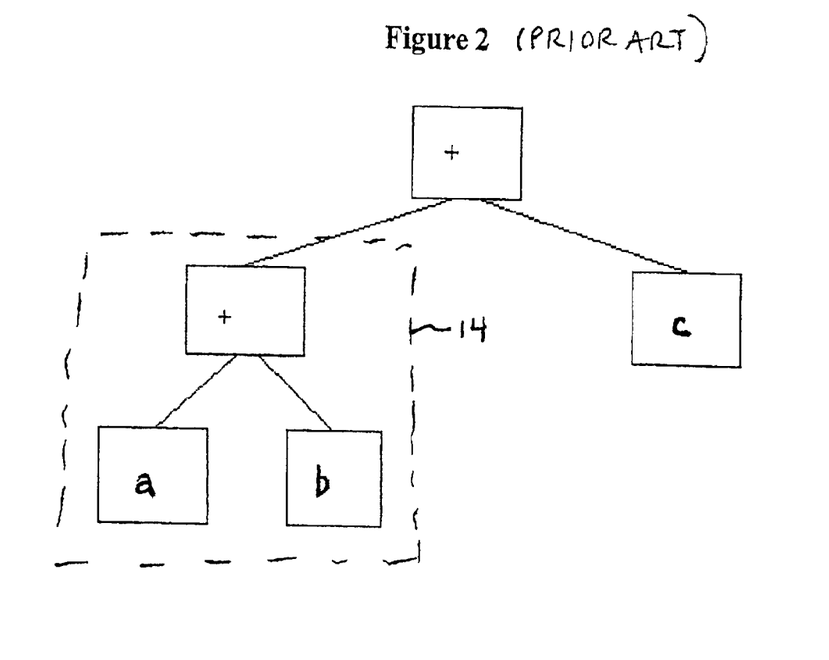
FIG. 2 shows a prior art tree representation that is analogous to the CTPR shown in FIG. 1.

A problem with prior art calculators and algorithms is that typically, expressions, e.g., formulas and equations, such as "a+b+c" are converted internally to CTPR, as shown in prior art FIG. 1, which form does not readily support the selection and replacement of subexpressions, for several reasons. First, CTPR does not mimic the visual representation that is viewed by a user due to the fact that the operators (e.g., +, −, *, and, or) are defined to be binary operators. For the example "a+b+c", the equivalent CTPR tree representation of FIG. 1 is shown in FIG. 2. This tree demonstrates that the +operator is binary in the CTPR, which leads to some valid subexpressions not being selectable, such as "b+c". The user of a CAS simply sees "a+b+c" and rightfully assumes that any adjacent terms are selectable. In the CTPR tree shown in FIG. 2, the subexpression "a+b" may be selected, as shown at 14. However, as is illustrated by FIG. 2, the valid subexpression "b+c" is not selectable. The CTPR tree would have to be restructured before "b+c" could be selected. The operators {−, *, or, and} exhibit the same problem in CTPR because they are binary.

Furthermore, with CTPR, the subtraction operator in a sum of terms causes additional difficulties. For the example "a−b+c", the user of a CAS should be able to select the "−b+c", which is not possible with CTPR. In addition, parentheses can be part of the visible representation; however, it is a waste of a user's effort to allow parentheses to be at the top-level of a selected subexpression. For example, in the expression "(a+b)+c" it is not desirable to allow the selection of "(a+b)", rather just "a+b".

Therefore, a process is needed in the art that allows for the selection of any valid subexpression of a mathematical expression that is represented in a CTPR. Furthermore, this process should provide a means to allow for the replacement of the selected subexpression with a new subexpression, e.g., replace "b+c" with "c+b".

Embodiments of the present invention achieve technical advantages by providing an algorithm and hand-held device capable of subexpression selection of expressions in CTPR where at least one of the operators, such as +, −, *, and, or are represented in a binary form, although visually these operators are represented in n-ary CTPR. Referring to Appendix B, the function SES_DidBuildTree( ) takes an expression in binary operator CTPR and loads it into a tree structure in which operators such as (+, −, *, and, or) are no longer represented in a binary format, but rather, an n-ary format. In this n-ary tree structure, each node represents a selectable subexpression. For example, the expression "a+b+c" is represented in an n-ary tree, shown in FIG. 4, with either "a+b" or "b+c" being selectable. This n-ary tree structure, along with the node pointers LeftSelNodeHdl and RightSelNodeHdl, defined in Appendix B, easily allows for the selection of any valid subexpression.

Figure 4:
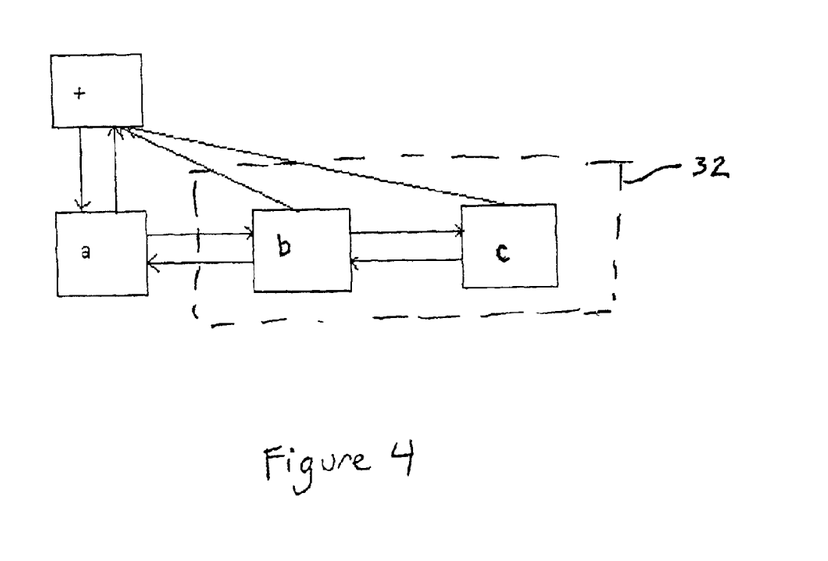
FIG. 4 shows an n-ary tree that an expression is loaded into for an expression with the string representation "a+b+c" in accordance with an embodiment of the invention.
Figure 5:
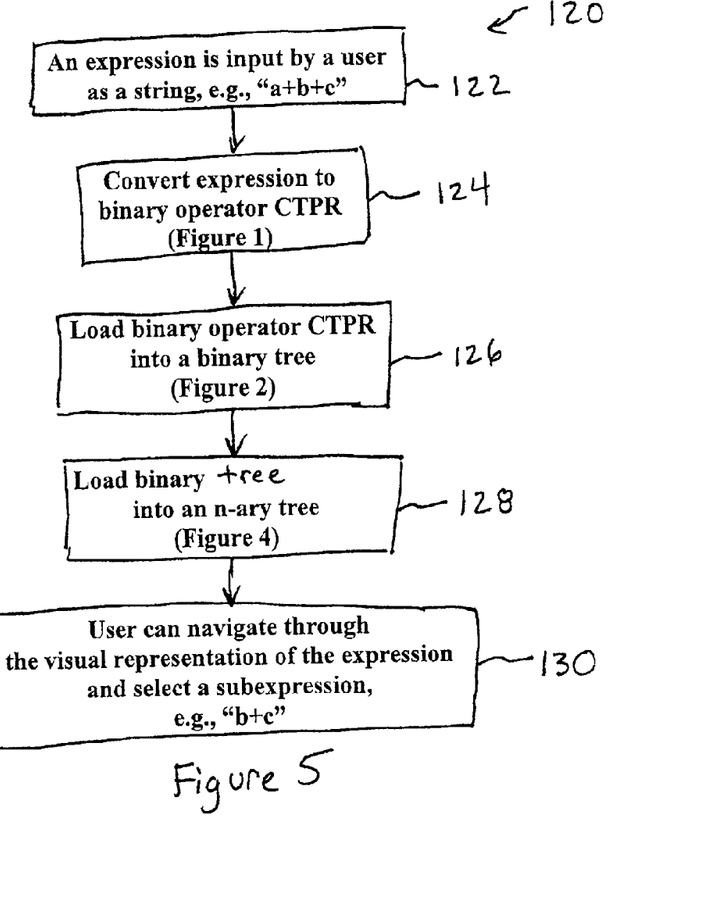
FIG. 5 illustrates a flow chart for selecting a subexpression of an expression in accordance with another embodiment of the present invention.

A flow chart for another preferred embodiment of the present invention is shown in FIG. 5 at 120. An expression is input by a user as a string, e.g., "a+b+c" (step 122) or selected from a history display of the handheld calculator. The expression is converted to binary operator CTPR, as shown in FIG. 1 (step 124). The binary operator CTPR is loaded into an equivalent binary tree representation or form, as shown in FIG. 2 (step 126). The binary tree is loaded into an n-ary tree, shown in FIG. 4 (step 128). The user can then navigate through the visual representation of the expression and select a subexpression, such as "b+c" (step 130).

After the subexpression is selected, the subexpression may be copied to another mathematical expression, or alternatively, may be transformed. For example, the hand-held calculator may comprise a menu allowing the user to select a "transform" function, which provides a list of possible transformations that may be performed on the subexpression selected. The list of possible transformations may include, as examples, form. This CTPR is referred to herein as "binary operator CTPR" form. The algorithm may be implemented in the application Symbolic Math Guide (SMG) that runs on the TI-89 and TI-92+ calculators, for example. A preferred embodiment of the top-level programming code is disclosed in Appendix A, and a preferred embodiment of exemplary detailed programming code in C, is disclosed in Appendix B. Appendix A and Appendix B may be found in the file "Appendix A and B" of the computer programming listing appendix provided on compact disc submitted with this patent application, which is incorporated by reference. However, the code disclosed herein is exemplary, and the embodiments described herein may be implemented in other types of code and form.

Figure 3:
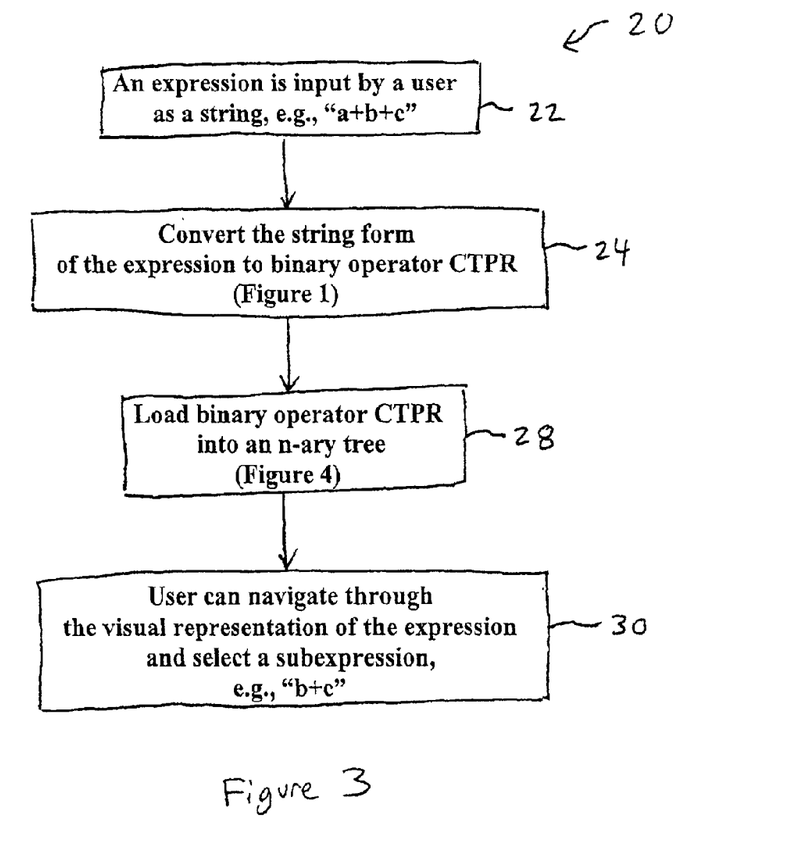
FIG. 3 illustrates a flow chart for selecting a subexpression of an expression in accordance with an embodiment of the present invention.

FIG. 3 illustrates a flow chart 20 for subexpression selection in accordance with an embodiment of the present invention. An expression is input by a user into the handheld calculator as a string, e.g., "a+b+c" (step 22) and its visual representation is displayed on the calculator screen. Alternatively, the expression may be selected from a history display, for example. The processor of the handheld calculator converts the string form of the expression to binary operator CTPR, as shown in FIG. 1 (step 24), a step not apparent to the user. The processor loads the binary operator CTPR into an n-ary tree, as shown in FIG. 4 (step 28). The user can navigate through the visual representation of the expression on the display and select a subexpression, e.g., "b+c", (step 30), as shown in FIG. 4 at 32.

Figure 6:
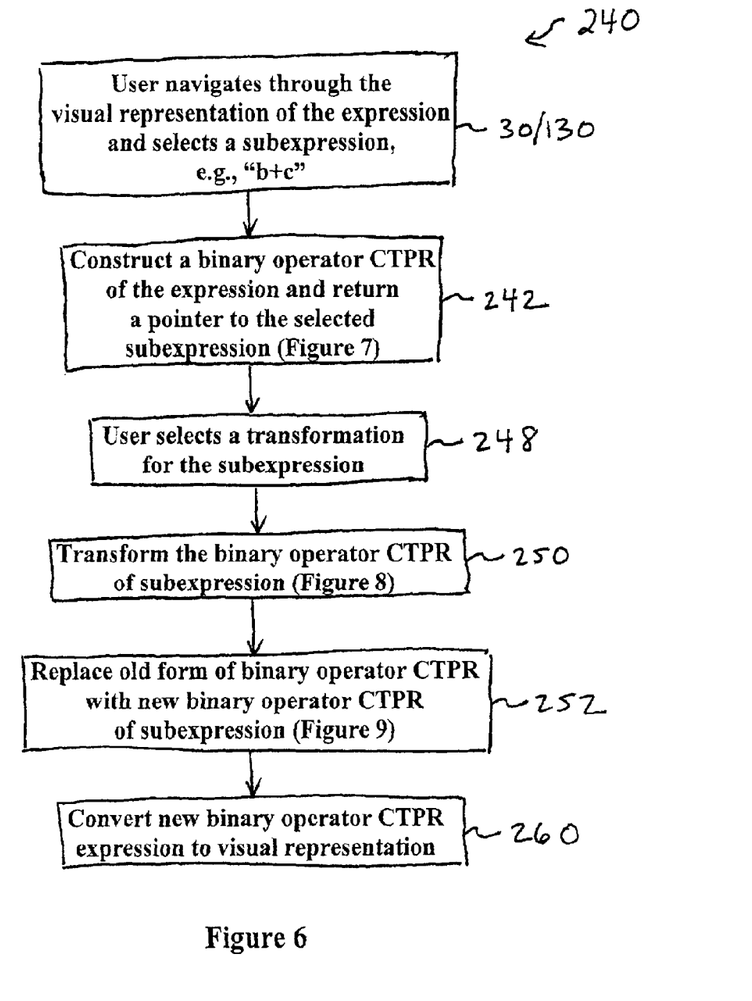
FIG. 6 illustrates a flow chart for transforming and replacing a selected subexpression of an expression in accordance with an embodiment of the present invention.
Figure 7:
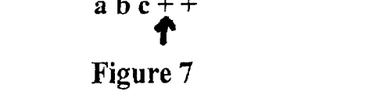
FIG. 7 shows a CTPR expression and a pointer indicating a selected subexpression.
Figure 8:
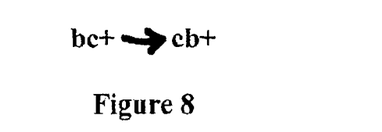
FIG. 8 illustrates a possible transformation of the selected subexpression from FIG. 7.
Figure 9:
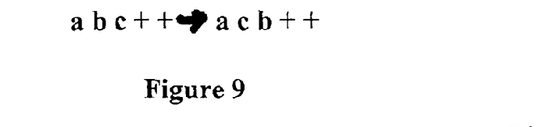
FIG. 9 shows a CTPR expression after the transformed subexpression of FIG. 8 is replaced into the expression.

Embodiments of the invention comprise an n-ary tree data structure that readily supports subexpression selection and overcomes the inadequacies of the binary operator "A+B" to "B+A"; "A–B" to "–B+A"; "A²–B²" to "(A–B)*(A+B)"; fact FIG. 6 illustrates a flow chart 240 of an embodiment of the invention where a selected subexpression is transformed and then replaced in the expression. A user navigates through an expression such as "a+b+c" and selects a subexpression, such as "b+c" (step 30/130 of FIGS. 3 and 5). A binary operator CTPR of the expression is constructed, and a pointer or index is returned to the selected subexpression, as shown in FIG. 7 (step 242). The user selects a transformation for the subexpression, for example, to change "b+c" to "c+b" (step 248). The binary operator CTPR of the subexpression is transformed, as shown in FIG. 8 (step 250). The old form of the binary operator CTPR of the subexpression is replaced with the new binary operator CTPR of the subexpression, as shown in FIG. 9 (step 252). The new binary operator CTPR of the expression is then converted to its visual representation (step 260).

Figure 10:
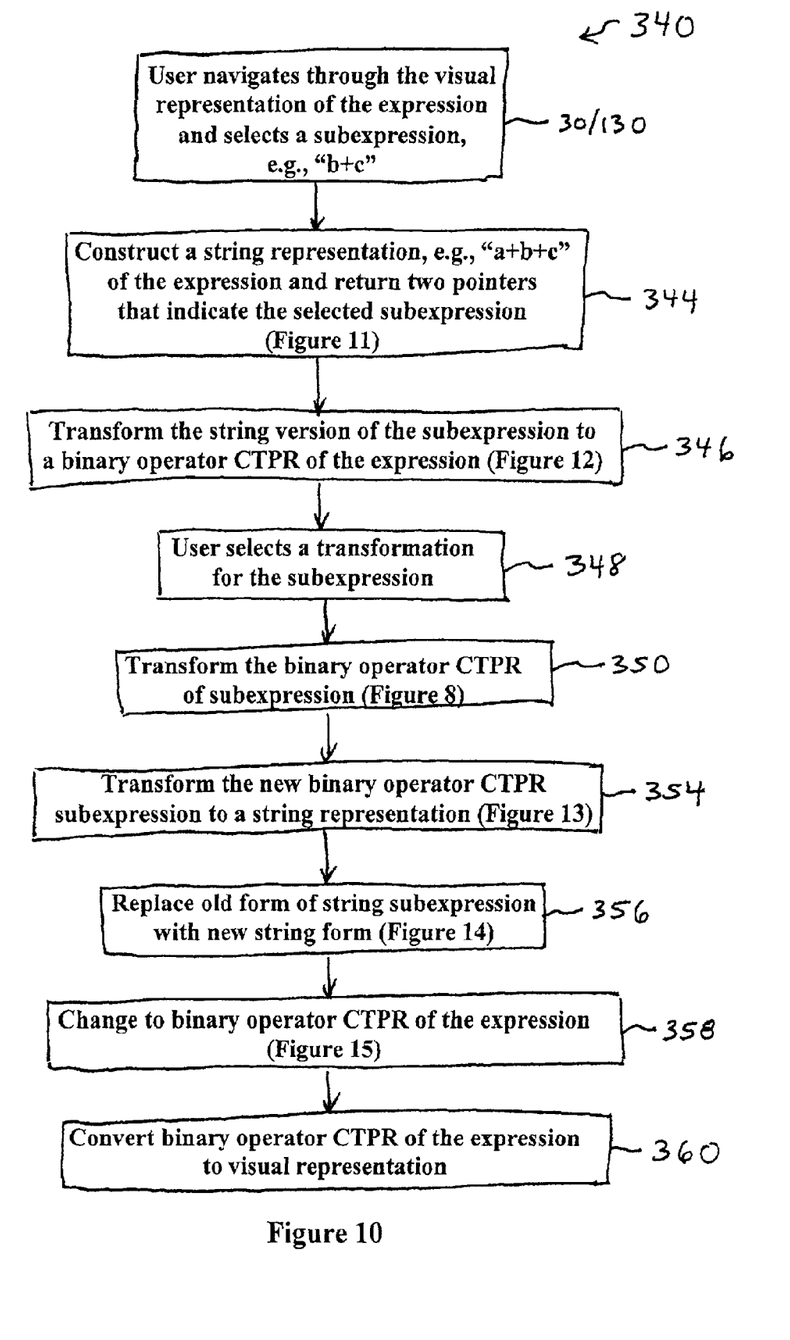
FIG. 10 illustrates a flow chart for transforming and replacing a selected subexpression of an expression in accordance with another embodiment of the present invention.
Figure 11:
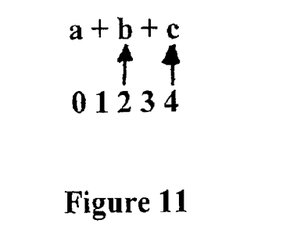
FIG. 11 shows a string representation of an expression, with two pointers indicating the subexpression selected.

Another embodiment of the invention is shown in FIG. 10, which illustrates a flow chart 340 for transforming a selected subexpression and replacing it in the expression. A user navigates through an expression such as "a+b+c" and selects a subexpression, such as "b+c" (step 30/130 of FIGS. 3 and 5). A string representation is constructed, e.g., "a+b+c" of the expression and two pointers or indexes are returned that indicate the selected subexpression, as shown in FIG. 11 (step 344). The pointers indicate the start and stop of the selected subexpression string, for example. An in-order traversal may be performed to assign appropriate string indexes to each node, for example. Using an in-order traversal, node "b" of the expression "a+b+c" is assigned the string position of 2 (the index begins at 0). Similarly, node "c" is assigned string position 4. When the subexpression "b+c" is selected, the entire string "a+b+c" is returned, along with two indexes or pointers into the string, the first position, 2, and the last position, 4.

Figure 12:
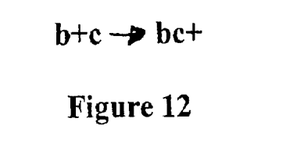
FIG. 12 illustrates the transformation of the selected subexpression of FIG. 11 into CTPR.
Figure 13:
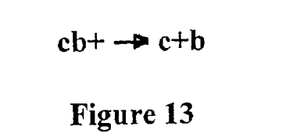
FIG. 13 illustrates the conversion of the transformed CTPR of the subexpression into a string format.
Figure 14:
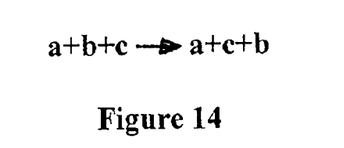
FIG. 14 shows the replacement of the string form of the subexpression with the transformed string form.
Figure 15:
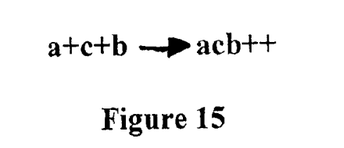
FIG. 15 shows changing the transformed string form of the expression back to CTPR.

The string version of the subexpression is transformed to the binary operator CTPR of the expression, as shown in FIG. 12 (step 346). The user selects a transformation for the subexpression, for example, to change "b+c" to "c+b" (step 348). The binary operator CTPR of the subexpression is transformed, as shown in FIG. 8 (step 350). The new binary operator CTPR of the subexpression is transformed to a string representation, as shown in FIG. 13 (step 354). The old form of string subexpression is replaced with the new string form, as shown in FIG. 14 (step 356). The string form of the expression is changed to the binary operator CTPR of the expression, as shown in FIG. 15 (step 358). The new binary operator CTPR of the expression is then converted to its visual representation (step 360).

Figure 16:
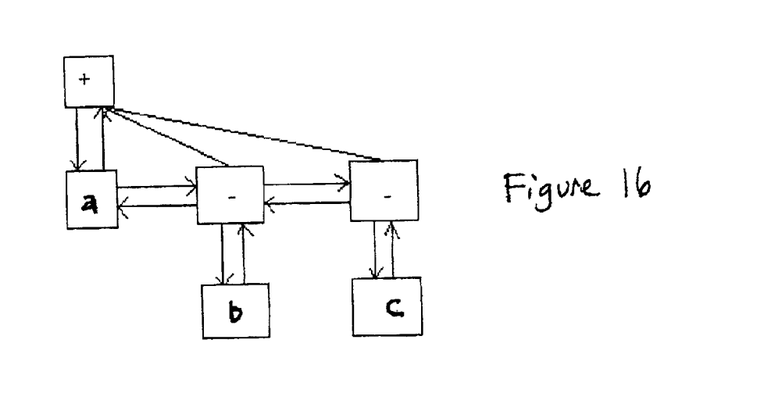
FIG. 16 shows a n-ary tree format of an expression containing subtraction, for the string "a−b−c"

Loading binary operator CPTR into n-ary tree data structure is particularly advantageous in expressions having subtraction and parenthetic operators. A subtraction operator may be handled by essentially treating it like a negate operator. For example, the expression "a–b–c" may be represented in n-ary tree form as shown in FIG. 16, although other n-ary tree forms may be utilized. The selection of any individual term or any two adjacent terms may be made with the data structure described herein.

Figure 17:
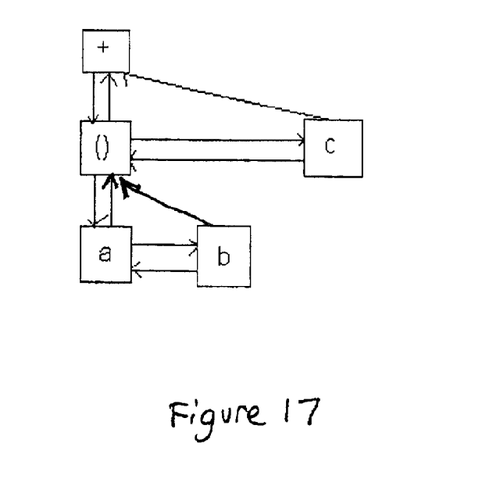
FIG. 17 shows a n-ary tree format of an expression containing parentheses, for the string "(a+b)+c"

Parentheses may be included in an n-ary tree data structure, as well. For example, the expression "(a+b)+c" may be represented as shown in FIG. 17. The parentheses nodes are included in the n-ary tree because this makes it easy to maintain the visual position of the subexpression within the entire expression; this information is needed to perform the visual selection that is viewed by the user. However, the logic in the function SES_DidMakeNewSelection( ) (of Appendix B) does not allow a parentheses node to be the top-level of a selected subexpression, which would typically be a waste of the user's effort.

Once a selection has been made, the function SES_PushExprAndReturnSubExprEsi( ) is called to transform the tree data structure back into binary operator CTPR and a pointer is returned that points to the selected subexpression making it easy to replace the selected subexpression with a new subexpression. Some care has to be taken when transforming back to the binary operator CTPR, because it is not always the identical form that was sent to the function SES_DidBuildTree( ). For example, if a user has chosen "b+c" in the expression "a+b+c", the returned binary operator CTPR will be "a b c ++" (as opposed to that of FIG. 1) so that "b+c" is a valid subexpression in this representation allowing it to be replaced by some new subexpression.

Figure 18:
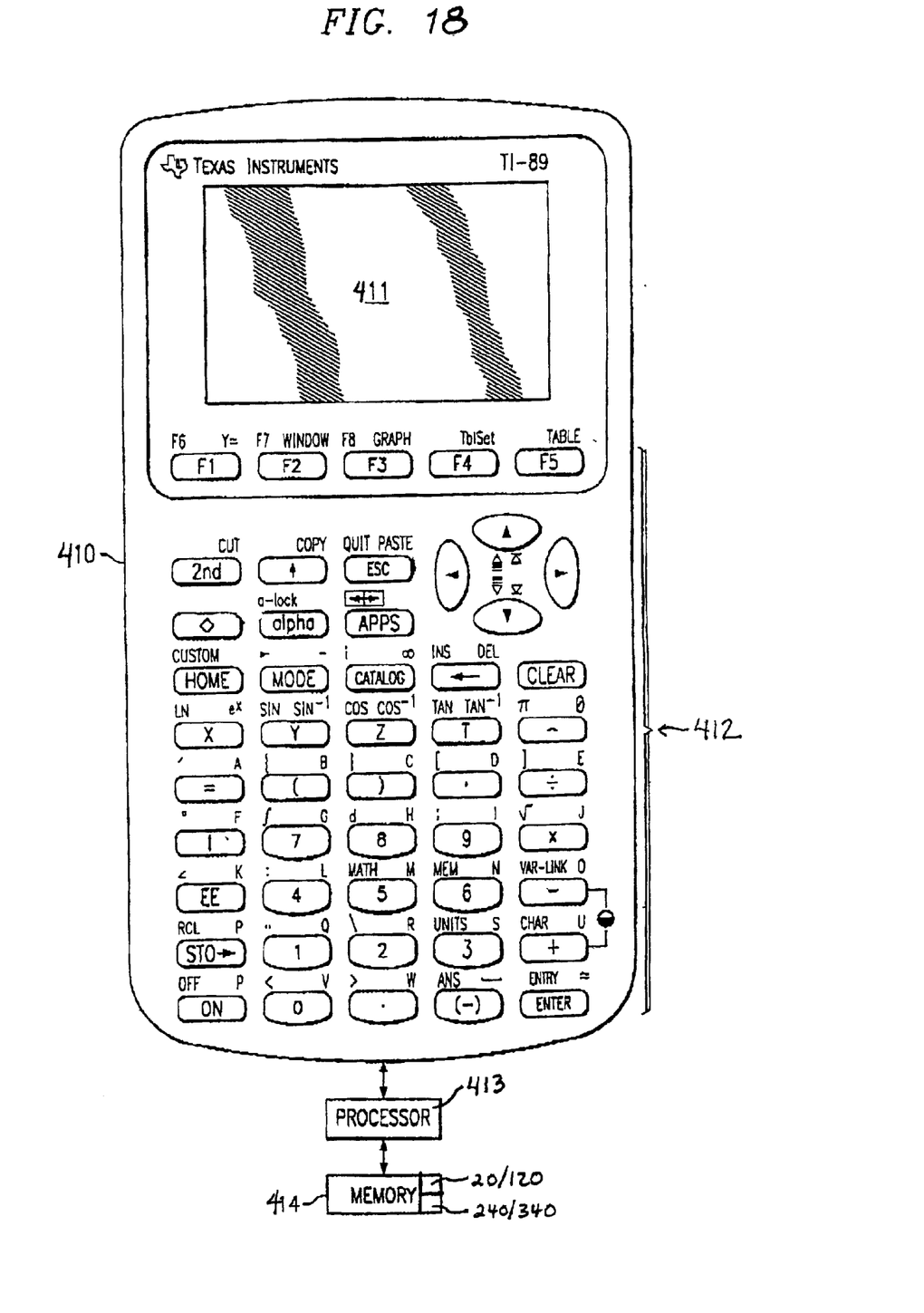
FIG. 18 illustrates a front panel of a handheld calculator in accordance with embodiments of the invention that allows the user to select mathematical subexpressions from expressions in accordance with the algorithms described herein.

FIG. 18 illustrates a front panel of a calculator 410 that is adapted to incorporate the features of embodiments of the present invention. Calculator 410 is described and shown herein in terms of particular software and hardware features of the TI-89, a commercially available graphing calculator manufactured by Texas Instruments Incorporated. Apart from the features of the present invention, many of the features of calculator 410 described herein are typical of graphing calculators, while other features are unique to the TI-89 and TI92 Plus "family" of TI calculators. The use of the TI-89 is for purposes of description, and does not limit embodiments of the invention. The features that are the subject of embodiments of the present invention may be incorporated into other calculators that provide graphical displays, or they may be incorporated into other computer-based teaching tools and handheld computers, as examples.

In FIG. 18, the screen 411 of calculator 410 has a "graphical display", as that term is used herein. In addition to the ability to draw graphical displays of various types, some of the software features of calculator 410 include software applications, loading, storage, and keystroke programming. The calculator 410 also permits data collection, display and analysis.

Various hardware features include a large pixel screen 411, which may be 100×160 pixels, for example. A keypad 412 has various keys for data and command entry, some of which are used to implement the invention and are described herein. The calculator includes a processor 413 connected to a memory unit 414 which may comprise a 256 K byte RAM and 721 K byte application space, as examples. The algorithms 20/120/240/340 described herein are adapted to reside in the memory unit 414 of the calculator 410. The calculator may also include an I/O port for data linking, and a unit-to-unit link cable connection capability, not shown. As is typical of calculators, the calculator 410 may include a secondary function key, the "2nd" key, which permits other keys to have two functions. For example, by pressing "2nd" key and then the "ESC/QUIT" key, the calculator performs the QUIT function. The calculator 410 may also include an "alpha", which when depressed makes the other keys subsequently depressed to input an alpha character.

While embodiments of the present invention are described herein with reference to the variables "a", "b" and "c", these variables may represent any mathematical expression, e.g., constants, variables, algebraic expressions such as $x^2$ or $x^{-2}$, and other functions such as sine, cosine, etc. The mathematical expressions are not limited to only three terms "a+b+c", but may comprise two or more terms, as examples. Embodiments of the present invention have application in selecting valid subexpressions of a variety of types of expressions e.g., in polynomial, quadratic, trigonometric, and other expressions, as examples.

Furthermore, embodiments of the invention are intended to have application in selecting valid subexpressions of a mathematical expression, e.g., subexpressions that can be selected visually with a single box. The subexpression selection disclosed herein is not intended to include the selection of nonadjacent operands of an n-ary operator. For example, "a+b" and "b+c" are considered valid subexpressions of the expression "a+b+c" while "a+c" is not.

Embodiments of the present invention provide the ability to conveniently select subexpressions of mathematical expressions that have been internally converted to binary operator CTPR, by the use of an n-ary tree. This n-ary tree eliminates the need to restructure the binary operator CTPR in order to select a given subexpression, saving code space and process time. For example, without loading the mathematical expression into an n-ary tree, in order to select the subexpression "b+c" from the binary operator CTPR of "a+b+c", the binary operator CTPR would have to be converted from that of FIG. 1 to that of FIG. 7. Because preferably, the n-ary tree mimics the visual representation of the expression, the n-ary tree does not have to be restructured while selecting any subexpression. Embodiments of the invention are particularly advantageous when the CTPR contains at least one operator +, −, *, "and", "or" that is binary.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. In addition, the order of process steps may be rearranged by one of ordinary skill in the art, yet still be within the scope of the present invention. It is therefore intended that the appended claims encompass any such modifications or embodiments. Moreover, the scope of embodiments of the present application is not intended to be limited to the particular embodiments of the process, machine, manufacture, composition of matter, means, methods and steps described in the specification. Accordingly, the appended claims are intended to include within their scope such processes, machines, manufacture, compositions of matter, means, methods, or steps. Graphing calculators are characterized by a larger screen, which permits the entry of mathematical objects or expressions in a logical format. They also permit graph displays and table displays. They have more sophisticated programming capability than other calculators, and often permit data transmission to other computing devices, directly or via a data storage medium, as well as data collection via various interface protocols. Particular calculator models are often designed for particular educational levels. For example, a calculator for middle school students might have less advanced features than one designed for older students. However, regardless of the level for which a calculator is designed, a continual goal in designing them is to provide a logical and easy-to-use interface.

Some prior graphing calculators allow the user to view a history screen, which is a scrolling display of previous display outputs. However, the user interface for these functions in the prior art was unable to select and incorporate mathematical subexpressions from the history screen. This function is disclosed in U.S. patent application Ser. No. 09/938,772, filed on Aug. 24, 2001 by Brothers, et al., entitled "Selection Of Mathematical Objects From The History Screen On A Handheld Device," which is incorporated herein by reference.

Calculators include many types of internal programming that is unnoticeable by a user. An example of this internal programming is the conversion of the representations of expressions, e.g., formulas containing variables, constants, and other operators, from a string format, e.g., "a+b+c", to a contiguous tokenized Polish representation (CTPR), shown at 12 in prior art FIG. 1. A CTPR form is often used

What is claimed is:

1. An algorithm for a handheld device for selecting a subexpression of a mathematical expression having a visible representation displayed on a screen on the handheld device, the algorithm comprising:
   selecting an expression string of the handheld device;
   converting the string to a contiguous tokenized Polish representation (CTPR) of the expression, wherein at least one operator of the CTPR is binary; and
   loading the CTPR of the expression into an n-ary tree, wherein the user may navigate within the visible representation of the expression to select a subexpression, wherein the handheld device is adapted to select the subexpression from the n-ary tree.

2. The algorithm according to claim 1, further comprising loading the CTPR of the expression into a binary tree, before loading the CTPR of the expression into the n-ary tree.

3. The algorithm according to claim 1, wherein the expression comprises "a+b+c", wherein the selectable subexpressions comprise "a+b" and "b+c".

4. The algorithm according to claim 3, wherein a, b and c comprise constants, variables, functions, algebraic expressions, or combinations thereof.

5. The algorithm according to claim 1, further comprising using the selected subexpression in another expression.

6. The algorithm according to claim 1, further comprising:

transforming the selected subexpression; and inputting the transformed subexpression into the expression.

7. The algorithm according to claim 1, wherein selecting an expression string comprises selecting an expression string from a memory display or selecting a expression string received from a user.

8. The algorithm according to claim 1, wherein the handheld device selects the subexpression using at least one index.

9. The algorithm according to claim 1, wherein the handheld device comprises a history display and a cursor, further comprising a user interface adapted to allow a user to:

scroll the cursor to a mathematical expression in the history display to select the expression string;

activate a subexpression mode having a selection box; and size and position the selection box over a subexpression.

10. The algorithm according to claim 1, wherein any adjacent operands are selectable.

11. The algorithm according to claim 1, wherein the n-ary tree mimics the visual representation of the expression.

12. A handheld device comprising:

a screen capable of displaying mathematical expressions in a visible representation, the screen including a cursor;

a key panel having keys at least capable of selecting positions of the cursor and moving the cursor horizontally or vertically on said screen;

a memory for storing at least an algorithm; and a processor for executing the algorithm, wherein the algorithm allows a user to select a subexpression of an expression, the algorithm comprising selecting an expression string, converting the string to a contiguous tokenized Polish representation (CTPR) of the expression, wherein at least one operator of the CTPR is binary, and loading the CTPR of the expression into an n-ary tree, wherein the user may navigate within the visible representation of the expression to select the subexpression, wherein the handheld device is adapted to select the subexpression from the n-ary tree.

13. The handheld device according to claim 12, further comprising loading the CTPR of the expression into a binary tree, before loading the CTPR of the expression into the n-ary tree.

14. The handheld device according to claim 12, wherein the expression comprises "a+b+c", wherein the selectable subexpressions comprise "a+b" and "b+c".

15. The handheld device according to claim 14, wherein a, b and c comprise constants, variables, functions, algebraic expressions, or combinations thereof.

16. The handheld device according to claim 12, further comprising using the selected subexpression in another expression.

17. The handheld device according to claim 12, further comprising:

transforming the selected subexpression; and inputting the transformed subexpression into the expression.

18. The handheld device according to claim 12, wherein selecting an expression string comprises selecting an expression string from a memory display or selecting a received expression string from a user.

19. The handheld device according to claim 12, wherein the handheld device selects the subexpression using at least one index.

20. The handheld device according to claim 12, wherein the handheld device comprises a history display and a cursor, further comprising a user interface adapted to allow a user to:

scroll the cursor to a mathematical expression in the history display to select the expression string;

activate a subexpression mode having a selection box; and size and position the selection box over a subexpression.

21. The handheld device according to claim 12, wherein the handheld device comprises a graphing calculator.

22. The handheld device according to claim 12, wherein any adjacent operands are selectable.

23. The handheld device according to claim 12, wherein the n-ary tree mimics the visual representation of the expression.

* * * * *